United States Patent Office 3,114,387
Patented Dec. 17, 1963

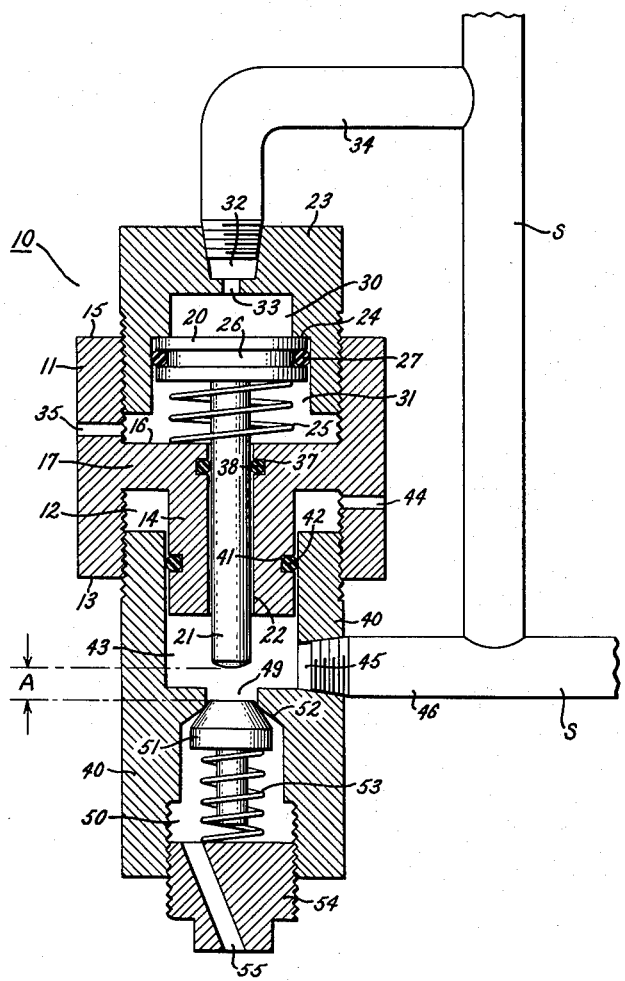

3,114,387
PRESSURE RELIEF VALVE FOR A HYDRAULIC SYSTEM
Philip Barkan, Lima, and Ugo R. Tognella, Philadelphia, Pa., assignors to General Electric Company, a corporation of New York
Filed Dec. 18, 1961, Ser. No. 160,134
8 Claims. (Cl. 137—494)

The present invention relates to a pressure relief valve for a hydraulic type of fluid handling system and, more particularly, relates to a pressure relief valve having a means to desensitize the valve to the effects of short-duration, high-pressure transients in the system.

A fluid handling system having a fluid pump should be provided with a relief device to protect the system from overpressures. Unlimited overpressures can destroy either the pump or its components and can also spring undesirable leaks in the fittings or seals of the fluid handling system. A pressure relief valve is one device to provide protection for such a system. The usual pressure relief valve is a normally-closed, pressure-sensitive device that operates when the pressure exceeds a predetermined level to open a pressure-relieving passageway leading from the system. The passageway is large enough to divert all of the excess fluid supplied by the pump when the system pressure exceeds the predetermined level.

It is customary to set the relief valve so that the pressure-relieving passageway is opened at a pressure only slightly greater than the normal desired pressure of the fluid handling system. In systems subject to shock, or water-hammer effects short duration transients or surges can occur during which the system pressure rises for very short intervals to levels much higher than the predetermined pressure for which the valve is set. Even in the absence of a pressure relief valve, these short-duration surges will ordinarily dissipate themselves before any system damage can occur. So it is unnecessary to system-protection that the relief valve be opened in response to such surges. As a matter of fact, it is desirable that the relief valve not operate in response to these surges, since unnecessary operations of the valve seriously shorten its life. The present invention is concerned with preventing such unnecessary operations without detracting from the ability of the valve to protect the system against persistent overpressures of a lower magnitude than the peak transient pressures.

One prior approach to this problem has been to incorporate a suitable orifice ahead of the relief valve so as to suppress the magnitude of the pressure surge felt by the valve. However, this approach is beneficial only when there is considerable resilience in the fluid within the system as, for example, in a pneumatic system. When a highly incompressible hydraulic fluid is present in the fluid handling system, the orifice does not effectively suppress these pressure surges and thus does not effectively desensitize the valve to such high pressure transients.

Accordingly, it is an object of the present invention to provide a new and improved relief valve in which the relief valve is effectively desensitized to transient pressure surges, even though the fluid in the system might be highly incompressible.

Another object is to provide an improved hydraulic relief valve that operates with a variable finite time delay to desensitize the valve to transient pressure surges.

Another object of the present invention is to provide a hydraulic relief valve in which desensitization is produced by causing the valve to operate after a time delay beginning with the onset of an overpressure condition and varying in duration inversely with the magnitude of the fluid overpressure.

A further object of the present invention is to provide a hydraulic relief valve having a new and improved desensitized operation which is adapted to facilitate the reclosing of the valve at a more precise line pressure.

Briefly, in accordance with the present invention, a hydraulic pressure relief valve is provided having a casing with first and second fluid chambers and with parallel connected inlet ports for the chambers. The inlet port for the first chamber has a fluid flow restriction. An outlet for the second chamber has a normally closed valve. A pressure responsive means in the first chamber is movable in response to fluid pressure therein above a predetermined level. An interconnecting means actuated by the pressure responsive means opens the normally-closed valve after a time delay interval that is determined by certain parameters, which include the area of the fluid flow restriction in the inlet port of the first chamber and the distance traveled by the pressure responsive means before opening the normally-closed valve. The fluid flow restriction is correlated with the pressure responsive means to develop the desired rate of movement of the pressure responsive means and provide an integrated time delay before the normally-closed valve is opened. The interconnecting means is constructed in such a manner that it is inoperative to transmit force from the pressure responsive means to the normally-closed valve until the pressure-responsive means has moved through a predetermined initial distance in response to persistent overpressure in the second chamber.

While the specification concludes with claims particularly pointing out and distinctly claiming the subject matter, which may be regarded as the invention, the organization and method of operation together with further objects and advantages thereof may best be understood by reference to the following description which is taken in connection with the accompanying drawing, in which:

The sole FIGURE is a sectional view of the hydraulic relief valve exposing the arrangement of the internal components of the relief valve.

Referring to the drawing, a valve casing 10 is shown comprising an adjustable collar 11 that has a concentrically positioned annular collar chamber 12 in one face 13 of the collar to define an axially extending collar core 14. The face opposite 15 of the adjustable collar 11 has a cup-shaped depression 16 that cooperates with the annular collar chamber 12 to define a common wall 17 generally midway of the longitudinal axis of the adjustable collar 11 and lateral to the longitudinal axis of the collar. A pilot piston 20 has a pilot plunger 21 that axially extends through a plunger bore 22 centrally located on the longitudinal axis of the collar core 14. The pilot piston 20 is retained by an inlet plug 23 threadably engaging internal threads of the cup-shaped depression 16. The inlet plug 23 is generally cup-shaped and is positioned so that an internal shoulder 24 limits the axial movement of the pilot piston 20 under the compression spring loading of a pilot piston spring 25. The pilot piston 20 has a circumferential piston groove 26 adapted to receive an O-ring 27 to provide a desired fluid seal between the inner periphery of the inlet plug 23 and the circumference of the piston 20.

On opposite sides of the pilot piston 20, there are inlet chamber 30 and a pilot piston spring chamber 31. An inlet port 32 is provided in the inlet plug 23 along the longitudinal axis of the valve casing and is constricted at one end to define a fluid flow restriction or orifice 33 upstream from the inlet chamber 30. A suitable inlet line connects the inlet port 32 with a fluid handling system partially shown at S. Any fluid leakage which may occur around the O-ring 27 from the inlet chamber 30 to the pilot piston spring chamber 31 is ducted away from the spring chamber by the spring chamber duct 35 to a sump, not shown. The plunger bore 22 has a collar groove 37 with an O-ring 38 therein to provide a similar fluid seal for the pilot plunger 21.

A relief cylinder 40 threadably engages suitable internal threads on the inner wall of the annular collar chamber 12 and cooperates with a core groove 41 that retains an O-ring 42 to provide a fluid seal between an inlet chamber 43 and the annular collar chamber 12. Any leakage of fluid into the annular collar chamber 12 may be ducted therefrom by the collar chamber duct 44 to the sump, not shown. The inlet chamber 43 in the relief cylinder 40 has a laterally opening inlet port 45 that is adapted to receive an inlet line 46 from the fluid handling system S. The inlet line 34 is connected in parallel with the inlet line 46 inasmuch as both of these inlet lines communicate independently with the fluid handling system. An outlet or pressure-relieving port 49 is provided in the relief cylinder 40 and permits fluid communication between the inlet chamber 43 and a relief valve spring chamber 50 when a relief valve 51 adapted for axial movement is displaced from a valve seat 52 adjacent to the outlet port 49. The relief valve 51 is normally biased closed onto the valve seat 52 by a relief valve spring 53. An axially extending relief plug 54 threadably engages the relief cylinder 40 to provide an adjustment means for a desired spring tension in the relief valve spring 53. A relief bore 55 provided in the relief plug 54 to afford communication between the relief valve spring chamber 50 and a suitable sump (not shown). Fluid passage is permitted from the inlet chamber 43 to the sump through the relief bore 55 when the relief valve 51 is displaced to an open position away from the valve seat 52.

In operation, the new and improved hydraulic relief valve permits adjustment of the compressive spring force of the relief valve spring 53 by means of the relief plug 54. The seating pressure of the relief valve 51 on the valve seat 52 can thereby be greater than the seating pressure of the pilot piston 20 on the inner shoulder 24 of the inlet 23. It is desirable that the compression of the relief valve spring 53 be so adjusted that the relief valve 51 is prevented from opening when subjected to intermittent transient overpressures in the inlet chamber 43. Such overpressures are generally of a short duration and the relief valve does not open each time to dump fluid from the fluid handling system to the sump. However, should the overpressure condition persist, the pilot piston 20 under the continuing overpressure is displaced away from the shoulder 24. The pilot plunger 21 will move simultaneously with the pilot piston 20 towards the relief valve 51 which is in the normally closed position. As the overpressure condition continues in the fluid handling system, additional fluid enters the inlet chamber 30 through the fluid flow restriction or orifice 33 to axially displace the pilot piston 20 until the pilot plunger 21 closes a finite gap A and impinges upon one face of the relief valve 51. The valve 51 is then displaced axially away from the valve seat 52 to permit fluid communication between the inlet chamber 43 and the relief valve spring chamber 50. The fluid passes from the relief valve spring chamber 50 through the relief bore 55 to the sump, not shown, which corrects the overpressure condition and prevents damage to either the pump or the fluid handling system.

Rotation of the adjustable collar 11 varies the finite gap A as desired and cooperates with the orifice 33 to determine the desired time delay and predetermined pressure required before the relief valve 51 is displaced to compensate for the continuing overpressure condition in the fluid handling system.

A limited adjustment of the spring tension of the pilot piston spring 25 can be made by rotating the inlet plug 23 to alter the position of the shoulder 24 and thus the spring biased position of the pilot piston 20. The time delay between the onset of a continuing overpressure condition and the opening of the relief valve 51, as determined by the retarded fluid flow through the orifice 33 and by the adjustable finite gap A, will vary in duration inversely with the magnitude of the overpressure. This time delay or interval is predetermined by the valve design parameters which, as described, include the proper size fluid flow restriction or orifice 33 in correlation with the adjustable finite gap A between the end of the axially displaced end of the pilot plunger 21 and one face of the relief valve 51. The new and improved hydraulic relief valve provides by reason of the time delay a relief valve which does not open for every high pressure transient or surge in the fluid of the system so that the useful life of the valve is considerably extended.

A feature of importance in the illustrated valve is that the interconnecting means 21 between the piston 20 and the normally-closed valve member 51 is inoperative to transmit any significant opening force to the valve member 51 during initial motion of the piston 20. It is only after the plunger 21 has moved entirely across the gap A that it becomes operative to transmit force from the piston 20 to the valve member 51. This relationship is important because it completely isolates the valve member 51 from those oscillations of the piston 20 that occur in response to short-duration transient pressures. Only after an overpressure has persisted long enough to drive the plunger 21 across the gap A does the plunger 21 become operative to transmit opening force to the valve member 51.

In a typical fluid handling system in which our invention is intended to be used, the normal system pressure is about 3000 p.s.i. Short-duration transients as high as 5500 p.s.i. are obtained under various normally-encountered shock conditions. The piston 26 is adjusted to move off its seat at 3300 p.s.i. in the chamber 30, but the valve member 51 is set to remain seated for pressures in excess of 5500 p.s.i. Short-duration transients having peaks exceeding 3300 p.s.i. will initiate downward movement of the piston 26, but before the plunger 21 of the piston can actuate the valve 51, the transient will normally have dissipated itself and therefore downward movement of the piston 26 will have terminated. Immediately thereafter the piston 26 will be restored to its normal position of the drawing by its reset spring 25. Assuming that the pressure in chamber 43 during the transient was no higher than 5500 p.s.i., as would be the case in all normally-encountered transient conditions in this particular fluid handling system, then the valve 51 would be maintained seated by its spring 53 during the transient since the valve 51 is set to remain closed for pressures exceeding 5500 p.s.i. in the chamber 43.

For persistent overpressures in excess of 3300 p.s.i., the piston 26 will continue moving downwardly until its plunger 21 impinges against normally-closed valve 51 and opens it to effect pressure relief. The length of time required for the piston 26 to effect opening of valve 51 will vary inversely with the magnitude of the overpresusre and directly with the length of the gap A.

Since the piston 26 is located apart from the relief valve's high flow region, i.e., the region through port 49, it will be apparent that the piston 26 can return to its normal position without significant impedance from the flow. Thus, this return movement can be set to occur at a relatively precise pressure. The valve 51 readily follows the piston 26 in resetting since its reset spring 53 is strong enough to easily overcome the effect of flow through port 49. This will be apparent from the fact that the spring 53 is strong enough to hold the valve 51 closed against pressures much higher than the pressure at which reclosing of the valve 51 is intended.

The fact that there is an exceptionally high force available for seating the valve member 51 when it closes after a pressure-relieving operation is advantageous for an additional reason. More specifically, this high closing force assures good seating of the valve member, which is important to port 49.

The opening force for our relief valve member 51 can also be quite high, since opening is effected through the piston 26. For a given overpressure, the amount of force available for opening the valve member 51 depends upon the ratio of the exposed area of the piston 26 to the exposed area of the valve member 51. Thus, by making this ratio large, the force available for opening the valve member 51 can be made large. For the typical pressures referred to hereinabove, the exposed area of the piston 26 is preferably made ten or more times as large as the exposed area of the valve member 51, i.e., the area of the valve member 51 bounded by the walls of relief port 49. With this high opening force available, there is less chance for the valve member to become stuck through binding or seizure, e.g., due to a gum build-up at the valve seat.

An additional advantage of our valve arrangement 10 is that it is capable, even without opening, of suppressing to some extent the short-duration surges referred to hereinabove. In this respect, the piston 26, in yielding in response to such surges, relieves some of the overpressure that would otherwise have accompanied the surge. To utilize this effect to best advantage, the valve arrangement should be as close as possible to the source of the surges. This source may, for example, be a control valve or a piston which abruptly strikes a stop.

As will be evidenced from the foregoing description, certain aspects of the invention are not limited to the particular details of the construction illustrated. For example, the inlet plug may be designed to have removable inserts whereby each insert has a different sized orifice. The desired retarding of fluid flow through the orifice may thus be varied by selecting the proper insert to correlate with the finite gap between the plunger and the relief valve. It is contemplated that other modifications and applications will occur to those skilled in the art; therefore, it is intended that the appended claims shall cover such modifications and applications that do not depart from the true spirit and scope of the invention.

Having described the invention, what is claimed is:

1. In a hydraulic system that has a normal system pressure and is subject to short-duration pressure surges that result in peak pressures exceeding said normal system pressure, a hydraulic pressure relief valve comprising: a casing having first and second fluid chambers, inlet ports for said chambers, means for connecting said inlet ports in parallel circuit relationship in said hydraulic system, the inlet port for said first chamber having a fluid flow restriction, an outlet for said second chamber, a normally closed valve in said outlet urged by pressure in said second chamber toward an open position, pressure responsive means in said first chamber having a normal position from which it is movable in response to fluid pressure therein of a predetermined minimum level that is higher than the normal system pressure but lower than the peak pressures resulting from said surges, means interconnecting said pressure responsivie means and said normally closed valve to open said valve in response to movement of said pressure responsive means through a predetermined stroke from said normal position, means for blocking said pressure responsive means from moving through said predetermined stroke while the pressure in said first chamber is below said predetermined minimum pressure, and means for holding said normally-closed valve closed during said pressure surges and at pressures in said second chamber above said predetermined minimum level and until opened by said pressure-responsive means, said interconnecting means being inoperative to transmit opening force to said normally-closed valve during initial movement of said pressure responsive means through said predetermined stroke.

2. The apparatus of claim 1 in which said pressure responsive means has a substantially larger area exposed to the fluid pressure in said first chamber than the area of said normally closed valve that is exposed to the fluid pressure in said second chamber.

3. A hydraulic pressure relief valve for a system that has a normal operating pressure and is subject to short duration surges that result in peak pressures exceeding said normal operating pressure comprising a casing having first and second fluid chambers, a common wall between said fluid chambers, an aperture in said wall, parallel connected inlet ports for said chambers, the inlet port for said first chamber having a fluid flow restriction, an outlet for said second chamber, a normally closed valve in said outlet, means for maintaining said valve closed during said short duration surges, a pilot piston in said first chamber having a normal position spaced from said common wall and movable toward said common wall in response to fluid pressure in said first chamber above a predetermined minimum level that is higher than said normal system pressure, means normally biasing said piston away from said common wall with a force that is great enough to hold said piston in said normal position at pressures below said predetermined minimum level, said piston further having an axially extending plunger passing through said aperture to open said valve in response to movement of said piston from said normal position to a position indicative of pressure above said predetermined minimum level persisting in said first chamber, said plunger having an initial position spaced from said normally-closed valve by means of a gap that is devoid of any connection between said plunger and said normally-closed valve so that initial movement of said plunger across said gap applies no force to said normally-closed valve.

4. A pressure relief valve for a system that has a normal operating pressure and is subject to short duration surges that result in peak pressures exceeding said normal operating pressure comprising a casing having first and second fluid chambers, a common wall between said fluid chambers, an aperture in said wall, parallel connected inlet ports for said chambers, the inlet port for said first chamber having a fluid flow restriction, an outlet for said second chamber, a normally closed valve in said outlet, adjustable means normally biasing said valve to the closed position with a force that is high enough to hold said valve in the closed position against fluid pressures in said second chamber higher than said peak pressures, and a pilot piston in said first chamber movable toward said common wall in response to fluid pressure in said first chamber above a predetermined minimum level that is higher than said normal operating pressure but lower than said peak pressures, adjustable means normally biasing said pilot piston away from said wall, said piston further having an axially extending plunger passing through said aperture to open said valve in response to movement of said piston to a position indicative of pressure above said predetermined minimum level persisting in said first chamber, said plunger having an initial position spaced from said normally-closed valve by means of a gap that is devoid of any connection between said plunger and said normally-closed valve so that initial movement of said plunger across said gap applies no force to said normally-closed valve.

5. A pressure relief valve for a system that has a normal operating pressure and is subject to short duration surges that result in peak pressures exceeding said normal operating pressure comprising a collar, a hollow plug threadably engaging said collar to define a first fluid chamber, a cylinder threadably engaging said collar to define a second fluid chamber, said collar having a common wall between said fluid chambers, an aperture in said wall, a first inlet port in said plug, said first inlet port having a fluid flow restriction, a second inlet port in said cylinder, said inlet ports being connected in parallel, an outlet in said cylinder, a normally closed valve in said outlet, adjustable means normally biasing said valve to the closed position with a force that is high enough to hold said valve in the closed position against fluid pressures in said cylinder higher than said peak pressures, a pilot piston in said first chamber, and means normally biasing said pilot piston away from said wall, said piston being movable toward said wall in response to a predetermined minimum pressure in said first chamber above said normal operating pressure but below said peak pressures, said piston further having an axially extending plunger passing through said aperture to open said valve in response to movement of said piston to a position indicative of pressure above said predetermined minimum pressures persisting in said first chamber, said plunger having an initial position spaced from said normally-closed valve by means of a gap that is devoid of any connection between said plunger and said normally-closed valve so that initial movement of said plunger across said gap applies no force to said normally-closed valve.

6. A hydraulic pressure relief valve for a system that has a normal operating pressure and is subject to short duration surges that result in peak pressures exceeding said normal operating pressure comprising a collar, a hollow plug threadably engaging said collar to define a first fluid chamber, a cylinder threadably engaging said collar to define a second fluid chamber, said collar having a common wall between said fluid chambers, an aperture in said wall, a first inlet port in said hollow plug, said first inlet port having a fluid flow restriction, a second inlet port in said cylinder, said inlet ports being connected in parallel, an outlet in said cylinder, a normally closed valve in said outlet, adjustable means normally biasing said valve to the closed position with a force that is high enough to hold said valve in the closed position against fluid pressures in said second chamber higher than said peak pressures, a pilot piston in said first chamber, means normaly biasing said pilot piston away from said wall said piston being movable toward said wall in response to a predetermined minimum pressure in said first chamber above said normal operating pressure but below said peak pressures, and interconnecting means between said piston and said valve including an axially extending plunger actuated by said piston, said plunger passing through said aperture to open said valve in response to movement of said piston through a predetermined stroke, said interconnecting means including a gap that is devoid of connection between said piston and said normally-closed valve and that renders said piston ineffective to apply force to said normally-closed valve until said piston has moved a distance corresponding to the length of said gap.

7. The pressure relief valve of claim 6 in which said means normally biasing said pilot piston away from said wall is adjustable to vary the initial position of said piston.

8. A hydraulic pressure relief valve for a system that has a normal operating pressure and is subject to short duration surges causing peak pressures higher than said normal operating pressure comprising a collar, a hollow plug threadably engaging said collar to define a first fluid chamber, a cylinder threadably engaging said collar to define a second fluid chamber, said collar having a common wall between said fluid chambers, an aperture in said wall, a first inlet port in said plug, said first inlet port having a fluid flow restriction, a second inlet port in said cylinder, said inlet ports being connected in parallel, an outlet in said cylinder, a normally closed valve in said outlet, adjustable means normally biasing said valve to the closed position with a force that is high enough to hold said valve in the closed position against fluid pressures in said second chamber higher than said peak pressures, a pilot piston in said first chamber, means normally biasing said pilot piston away from said wall but allowing said pilot piston to move toward said wall in response to a predetermined minimum pressure in said first chamber greater than said normal operating pressure but less than said peak pressures, and an axially extending plunger actuated by the pilot piston, one end of said plunger being spaced apart from the valve by means of a gap that is devoid of connection between said valve and said plunger, said end acting to engage and open the valve in response to movement of said piston to a position indicative of pressure above said predetermined minimum pressure persisting in said first chamber.

References Cited in the file of this patent

UNITED STATES PATENTS

| 287,105 | Cullingworth et al. | Oct. 23, 1883 |
| 1,406,026 | Jensenius | Feb. 7, 1922 |
| 2,177,057 | Davis | Oct. 24, 1939 |
| 2,287,936 | Hose | June 30, 1942 |
| 2,890,715 | Ebersold | June 16, 1959 |

FOREIGN PATENTS

| 883,220 | Germany | July 16, 1953 |